Jan. 10, 1967 J. S. HICKMAN Re. 26,141

SIDE LAP VAPOR VENT

Original Filed Aug. 15, 1960 2 Sheets-Sheet 1

Inventor.
John S. Hickman.

By Merriam, Smith & Marshall
Attys.

Jan. 10, 1967 J. S. HICKMAN Re. 26,141

SIDE LAP VAPOR VENT

Original Filed Aug. 15, 1960 2 Sheets-Sheet 2

Inventor
John S. Hickman

By Merriam, Smith, & Marshall
Attys.

United States Patent Office

Re. 26,141
Reissued Jan. 10, 1967

26,141
SIDE LAP VAPOR VENT

John S. Hickman, Shorewood, Wis., assignor to Inland Steel Products Company, Milwaukee, Wis., a corporation of Delaware Original No. 3,208,189, dated Sept. 28, 1965, Ser. No. 49,466, Aug. 15, 1960. Application for reissue Nov. 8, 1965, Ser. No. 507,083
13 Claims. (Cl. 52—534)

Matter enclosed in heavy brackets [ ] appears in the original patent but forms no part of this reissue specification; matter printed in italics indicates the additions made by reissue.

This invention relates to metal roof-deck panels which are formed as corrugated sections having sloped-web rib-shaped cross-sections.

Roof deck panels *which generally comprise a plurality of corrugations that are parallel to a pair of opposite side edges of the panel*, are used as a support for roof or floor construction proper which consists usually of mixtures of concrete containing aggregate fill over which in desired arrangement may be layers of asphalt fill, tar and gravel, or any of them. To preserve the structure and to expedite construction, the present invention provides easy draining features. This is done by providing a plurality of raised or embossed elements formed into at least the web or the trough-like side-lap portions nearest the panel edge.

These embossings are arranged to extend outwardly in such fashion that when two deck panels are arranged in cooperating relationship to each other with their end sections overlapped, a spaced-apart relationship is established between them so that any mixture remaining in the insulating concrete slab after pouring upon the roof-deck panels and subsequent to the time a built-up formation has been applied thereover is adequately vented in the overlapped panel regions.

The built-in embossings herein to be described are raised or pressed outwardly from the surface of the side-lap web portions so that complete nesting together of overlapping trough-like web portions of adjacently positioned roof-deck sections cannot occur. Consequently, escape of moisture from any coverings thereover is insured in the free space between the panel sections.

In roofing construction employing lightweight concrete slabs over the deck sections for insulation purposes, venting of entrapped moisture in the slab has been a problem that has faced the trade for some time. Lightweight concrete insulating roof construction consists generally of steel joists with galvanized roof-deck panels welded to the joists. A lightweight insulating concrete slab with a tar and gravel covering is usually applied over the panels to form the built-up roof. Perlite and vermiculite types of insulating concrete are the most popular and frequently used for such coverings. It is particularly the use of these lightweight fills of concrete mix that creates the need for a side-lap vent.

These lightweight aggregate fills are generally a well saturated mix to facilitate easier pouring of the slabs and the volume of water in the initial mix is considerably in excess of that required for normal concrete hydration. Venting of this free and excess water following the application of the tar and gravel built-up roofing over the insulating slab is important since it has been found uneconomical to delay the final construction and application of the covering elements until after the aggregate has completely cured and dried out.

In the past, various types of vent clips were used on the overlapped sloped trough-like web portions to prevent complete nesting together of overlapped panels which otherwise would restrict and close off the moisture escape route and leave large quantities of moisture entrapped in the concrete slab. Entrapped moisture held under the built-up roofing often led to roof failure because of the tendency of blisters to develop in the built-up roofing due to the created vapor pressure developed within the roof as heat from the sun caused the roof temperature to rise and thereby produce vaporization of entrapped water. Since the atmospheric pressure above the roof was lower than the vapor pressure within the concrete slab, the only escape of the vapor was by way of a produced blister which came about with the roof failure.

The present invention makes possible the complete elimination of vent clips by a positive venting system provided by the structural features herein to be described. As the roof deck panels of the present invention are constructed, the sloping trough-like web sections of the panel side-lap portions have embossings extending outwardly therefrom. While such embossings may assume various configurations, they will herein be illustrated and described in the forms of ribs or dimples. In the case of a rib construction the embossing extends in a direction substantially transverse of or normal to the longitudinal axis of the side-lap portions. They are located at selected positions and distances along the longitudinal axis of the web and, with assembly of adjoining panel sections, prevent the nesting together of the adjacent sloping sides and bottoms of the trough-like web portions. Similarly, in the case of dimples, the sloped roof deck panels are spaced and also thereby insure a built-in venting system from which moisture contained within the concrete covering the slab can escape into the interior of the building below to eliminate the hazard of structural failure.

The invention will now be described in two of its forms in conjunction with the accompanying drawings in which.

Figure 6:
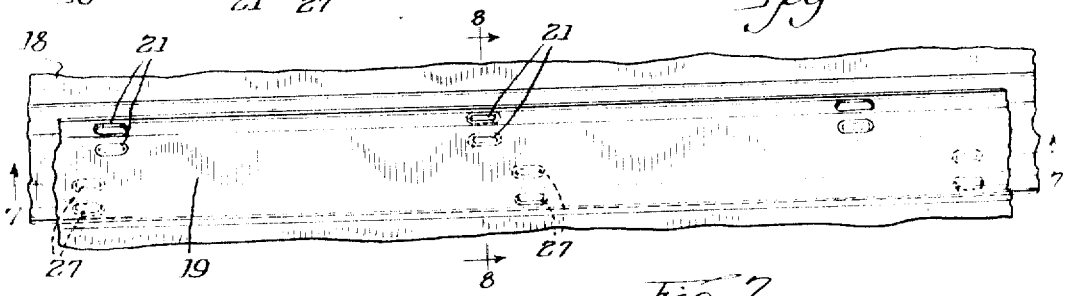
FIG. 6 is a plan view of two overlapping trough-like side-lap portions showing the dimples on different center-to-center dimensions along the longitudinal axis of the side-lap portion to prevent any possible lapping of the dimples which would preclude proper venting.
Figure 7:
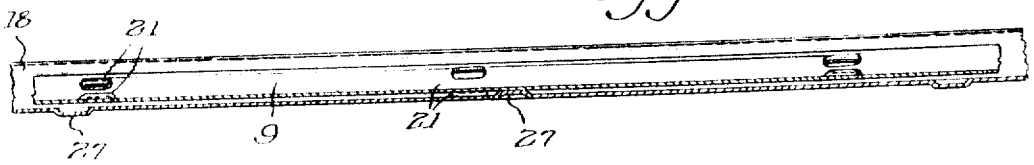
Figure 8:
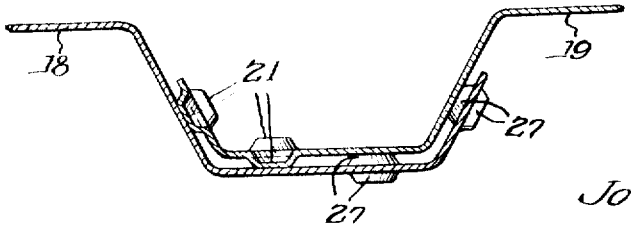

FIG. 7 is a sectional view taken through line 7—7 of FIG. 6 showing the dimples holding the overlapping trough-like side-lap portions in a spaced-apart relationship, thereby creating a venting system therebetween; and FIG. 8 is a sectional view taken through line 8—8 of FIG. 6 showing an end view through the dimples to provide the spaced-apart relationship of the overlapped trough-like side-lap portions creating a vent system between the spaced-apart side-lap portions.

Figure 1:
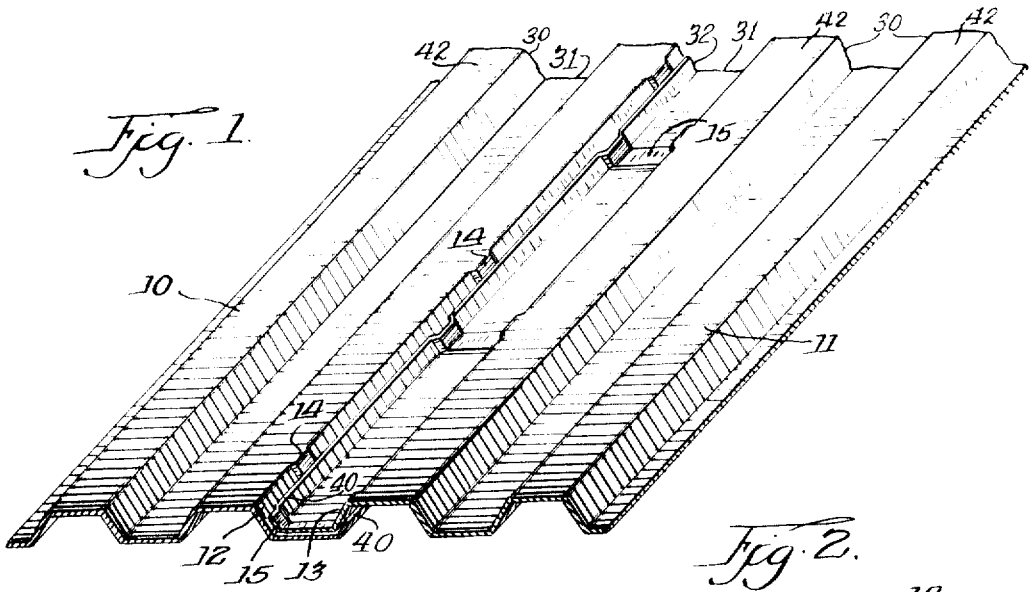
FIG. 1 is an isometric view of portions of two adjoining corrugated roof-deck panels, showing the sloping wall trough-like side-lap portions in overlapped relationship having at their edge regions embossings in the form of transverse built-in ribs for maintaining the side-lap portions in a spaced-apart relationship relative to adjoining panels to create a vent therebetween.

Now, referring to the drawings and specifically to FIG. 1, thereof, for the purpose of indicating the final use of the invention, two sections of roof-deck panels 10 and 11, each having an upper edge 40 defining a terminal side wall edge are shown in the form of corrugated sections with their respective oppositely spaced inner 30 and outer 32 side walls being connected by a bottom wall 31 forming the trough-shaped portions 12 and 13 shown in an overlapping relationship. The trough-shaped portions of the panels are connected together by top walls 42. Embossings or embossing means are formed in these members as built-in ribs 14 and 15 which extend substantially transverse to the longitudinal axis of panel webs as to the panel edge. Each of the transverse ribs 14 and 15 which extend outwardly from the roof section, as indicated, is preferably formed on different center-to-center spacings resulting in a rib staggering sufficient to prevent a cut-off of the venting system therebetween no matter how far out of tolerance the ribs may be or at what angle the edge ribs nest.

Figure 2:
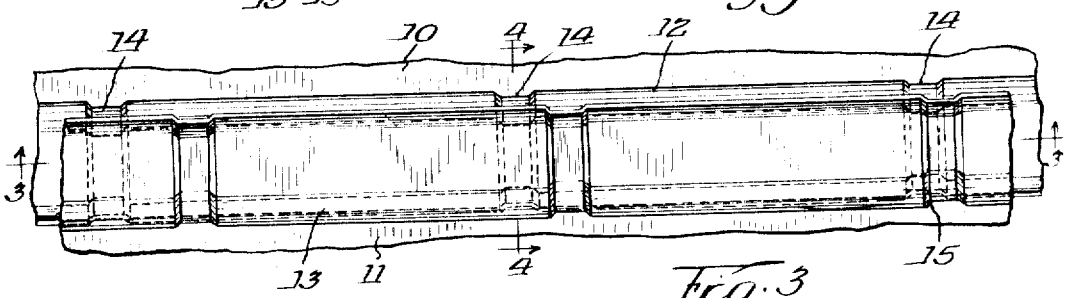
FIG. 2 is a plan view of two overlapping trough-like, side-lap portions showing the transverse built-in ribs on different center-to-center dimensions along the longitudinal axis of the side-lap portions to prevent any possible lapping of the ribs which would preclude proper venting.
Figure 3:
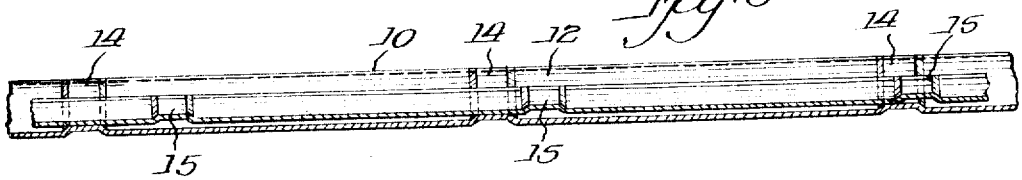
FIG. 3 is a sectional view taken through line 3—3 of FIG. 2, to show more clearly the spaced-apart relationship between the overlapping trough-like side-lap portions.
Figure 4:
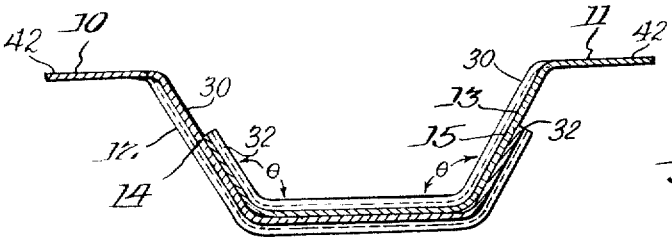
FIG. 4 is a sectional view taken through line 4—4 of FIG. 2 showing an end view through one of the transverse ribs having the spaced-apart relationship of the overlapped trough-like side-lap portions creating a vent system therebetween.

An enlargement of the two overlapping web portions 12 and 13 is shown in FIG. 2 which emphasizes the staggered positions of the ribs 14 of the web portion 12 and the ribs 15 of the web portion 13. A similar relationship is also shown in FIGS. 3 and 4. Illustratively, in a preferred construction, the rib depth may be a relatively minor distance, say one-sixteenth inch, since the main feature is to preclude the web sections from contacting each other over their entire area. Great tolerance is permissible in the rib width and, illustratively, and without limitation the rib may be of chosen width, such as ⅛" to 1" or wider. The ribs may be embossed or formed in various ways into the metal of the deck. Where the ribs are of uniform width stationary or flying dies are frequently used to form the structure, depending upon the manufacturing process. If the rib formation is to be tapered, each of which forms is herein clearly contemplated, so as to be wider at its top or outer end than at the bottom, the formation is readily provided by cycloid shaped meshed rolls.

Another embodiment of the present invention which employs the same broad principle and also insures a positive venting system is shown by FIGS. 5, 6, 7, and 8 of the drawings. In these figures the built-in ribs are replaced by dimples extending outwardly from the trough-like web portions. The dimples are selectively located to maintain the web portions of adjoining roof-deck panels in assembly in a spaced-apart relationship to provide a venting system therebetween.

Figure 5:
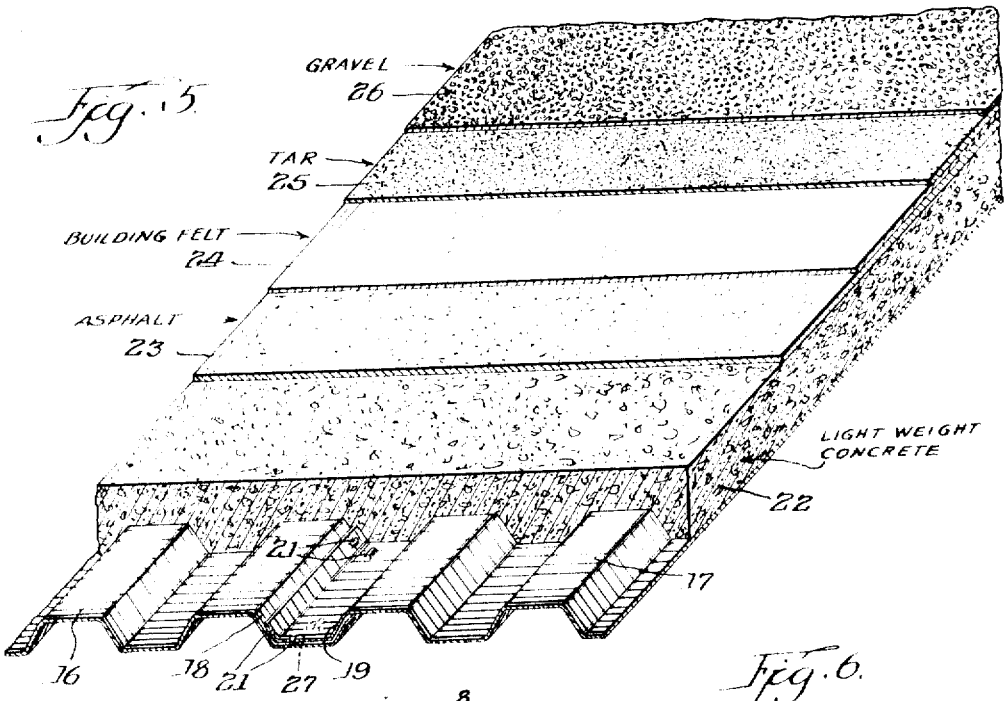
FIG. 5 is an isometric view of a section of a built-up roof showing another embodiment of the invention, with the trough-like side-lap portions being embossed with outwardly extending dimpled, rather than ribbed, regions to locate the overlapping side-lap portions in a spaced-apart relationship to provide a vent therebetween.

A portion of a built-up roof of the type in which the present invention is particularly suitable for use is shown in FIG. 5 with sections of adjoining roof-deck panels 16 and 17 shown with their respective trough-like web portions 18 and 19 in overlapping relationship. The web portion 19 has dimples 21 which are raised from the web portion to abut the underlying web portion 18 of the roof-deck panel 16 and thereby maintain overlapping trough-like web portions 18 and 19 in a spaced-apart relationship and provide a venting system therebetween.

Each construction is such that a covering of lightweight concrete 22 containing lightweight aggregate fill, such as Perlite, vermiculite, or the like, is poured upon the roof-deck panels 16 and 17. Over this lightweight concrete slab there is usually a layer of asphalt 23 upon which the built-up roofing consisting of building felt 24, tar 25, and gravel 26 is applied in as many layers or combinations as may be desired or warranted by the roofing required.

An enlargement of the two overlapping trough-like web portions 18 and 19 similar to that shown in FIG. 3 sets forth the selective placement of the dimples 21 of web portion 19 with respect to the dimples 27 of web portion 18, as shown in broken lines underlying the web portion 19. The dimples 21 of web portion 19 are arranged so as to abut the surface of web portion 18 and thereby maintain webs of the adjoining roof-deck panels 16 and 17 in a spaced-apart relationship and provide a venting system therebetween.

The venting system between the trough-like web portions 18 and 19 is also shown in FIG. 7, which is a sectional view taken through the lines 7—7 of FIG. 6 to show the dimples maintaining the webs in their spaced-apart relationship. The spaced-apart relationship of the two side-lap portions 18 and 19 is also shown in FIG. 8 which shows the dimples 21 of web portion 19 abutting the surface of web portion 18 and the raised dimples of portion 18 abutting the surface of portion 19 to retain the two webs in the required spaced-apart relationship for venting.

*Thus, as clearly shown, for example, in FIGS. 7 and 8, the outer side wall defining the outermost corrugation of the panel is deformed alternately along the extent of the side wall inwardly and outwardly.*

*The portion along the inner wall of the trough-shaped portions located along the terminal edges of the panel is not deformed as seen in FIGS. 6–8 such that it is substantially constant along a straight path for substantially the length of the respective trough-shaped portion.*

As an illustration of the construction procedure, since the most popular types of aggregate used in light-weight insulating concrete are Perlite and vermiculite and since to saturate these aggregates, a larger volume of water than that normally required for concrete hydration is used to facilitate easy pouring of the roof, the amount of water contained in such a slab after pouring is large. In the construction for a 2½" fill over the roof-deck panels using a 1 to 6 mix (which means that 1 bag of cement, containing approximately 1 cubic foot of cement or 94 pounds is to be mixed with 6 cubic feet of lightweight aggregate such as Perlite or vermiculite) the water formula and drying conditions preferably should be such that the water content in the concrete would be as follows:

PERLITE MIX

| Days after pouring: | Water content, qts./sq. ft. |
|---|---|
| 0 | 1.5 |
| 7 | .8 |
| 14 | .4 |

VERMICULITE MIX

| Days after pouring: | Water content, qts./sq. ft. |
|---|---|
| 0 | 2.5 |
| 7 | 1.8 |
| 14 | .9 |

The built-up roofing is usually applied over the lightweight insulating concrete slab after about seven days, whereupon there is always an impervious waterproof membrane over the concrete. This invention provides ways and means by which any entrapped moisture can readily be vented when the rib sections maintain a desired spacing between overlapped sections of the roof.

The roof-deck panel is usually made from galvanized sheet steel and may be considered as carrying the roof load. The ribs herein explained and discussed have been shown as extending outwardly, which is the preferred construction with a rather high tensile, low percent elongation deck material. For some conditions, however, it is possible to have the venting ribs extend in the opposite or inwardly direction. This is particularly true in cases where the galvanized steel sheet is of relatively low tensile higher percent elongation, making it easy to carry forward the embossing process in either direction, as desired. Therefore, it is to be understood that the invention, while shown in its preferred form, is also capable of being carried by reversing the procedure described.

Having now described the invention, what is claimed is:

1. A roof deck over which moisture bearing construction material can be poured, said roof deck comprising:

a plurality of overlapped panels;

each of said panels having a lapped edge;

each of said panels having a trough-shaped portion extending along said lapped edge;

each of said trough-shaped portions having a bottom wall and opposite inner and outer side walls connected by said bottom wall;

the outer side wall of each of said trough-shaped portions having an upper edge defining a terminal side wall edge on each of said panels, said trough-shaped portion which extends along a lapped edge of one of said panels overlapping and nesting with at least part of said trough-shaped portion which extends along a lapped edge of an adjacent panel, so that the outer side wall of one trough-shaped portion on one of the overlapped panels is adjacent the inner side wall of said adjacent nested trough-shaped portion of the other of the overlapped panels to form a first set of nested adjacent side walls, and the inner side wall of said one trough-shaped portion is adjacent the outer side wall of said adjacent nested trough-shaped portion to form a second set of nested side walls;

spacing means projecting away from one of said side walls of said first set of nested side walls and abutting the other side wall of said first set; and spacing means projecting away from one of said side walls of said second set of nested side walls and abutting the other side wall of said second set; said spacing means positively spacing the side and bottom walls and said upper edge of each of said nested trough-shaped portions from any substantial contact with the side and bottom walls and upper edge of the other of said nested trough-shaped portions; said spacing means being disposed at spaced intervals along the length of said trough-shaped portions, thereby defining a transverse moisture-venting passageway between the nested trough-shaped portions.

2. A roof deck in accordance with claim 1 and including spacing means projecting away from all the walls of said overlapped and nested trough-shaped portions.

*3. A rectangular metal sheet having a plurality of spaced longitudinal trough-shaped portions parallel to a pair of opposite side edges;*

*the outermost trough-shaped portion along each of said pair of side edges defining the terminal side portion of the sheet;*

*each outermost trough-shaped portion having an upwardly and outwardly inclined substantially planar outer side wall terminating as one of said side edges;*

*a substantially planar bottom wall extending transversely of said side edge as a continuation of the lower portion of the outer side wall to define the base of said respective outermost trough-shaped portion;*

*an upwardly and inwardly inclined inner side wall extending as a continuation of said respective bottom wall and to a position at least above a plane containing said side edges;*

*a plurality of top walls extending transversely of said side edges connecting said spaced trough-shaped portions;*

*both of said upwardly and outwardly inclined outer side walls of said outermost trough-shaped portions having venting and spacing means projecting away therefrom, said venting and spacing means being disposed at spaced intervals along the length of said outer side walls, the remainder of said outer side walls being substantially smooth, and*

*said top walls and remaining trough-shaped portions being substantially smooth and free of said venting and spacing means.*

*4. A rectangular metal sheet in accordance with claim 3 wherein said venting and spacing means project away from said bottom and inner side walls of said outermost trough-shaped portions, said venting and spacing means being disposed at spaced intervals along the length of said bottom and inner side walls, the remainder of said outer bottom and inner side walls being substantially smooth.*

*5. A rectangular metal sheet in accordance with claim 3 wherein said venting and spacing means are ribs.*

*6. A rectangular metal sheet in accordance with claim 3 wherein said venting and spacing means are dimples.*

*7. A rectangular metal sheet having longitudinal trough-shaped portions parallel to a pair of opposite side edges, the outermost trough-shaped portion along each of said pair of side edges defining the terminal side portion of the sheet;*

*each outermost trough-shaped portion having an upwardly and outwardly inclined outer side wall terminating as one of said side edges;*

*a bottom wall extending transversely of said side edge as a continuation of the lower portion of the outer side wall to define the base of said respective outermost trough-shaped portion;*

*an upwardly and inwardly inclined inner side wall extending as a continuation of said respective bottom wall;*

*a plurality of top walls extending transversely of said side edges connecting said trough-shaped portions;*

*each of said upwardly and outwardly inclined outer side walls having venting and spacing means projecting away therefrom;*

*said venting and spacing means being located at spaced intervals along the extent of said outer side wall, the remainder of said outer side wall being substantially smooth; and*

*the inner side wall of each of said outermost trough-shaped portions being substantially smooth and free of said venting and spacing means for substantially the length of the respective outermost trough-shaped portions.*

*8. A rectangular metal sheet in accordance with claim 7 wherein said venting and spacing means project transversely inwardly and outwardly along the extent of said outer side wall.*

*9. A rectangular metal sheet in accordance with claim 7 wherein said venting and spacing means are dimples.*

*10. A concrete form comprising a plurality of adjacent metal sheets;*

*each sheet having longitudinal trough-shaped portions parallel to a pair of opposite side edges;*

*the outermost trough-shaped portion along each of said pair of side edges defining a terminal side portion of the sheet;*

*at least one of said outermost trough-shaped portions lapping and nesting with at least a portion of an outermost trough-shaped portion of an adjacent sheet;*

*each outermost trough-shaped portion having an upwardly and outwardly inclined outer side wall terminating as one of said side edges;*

*a bottom wall extending tranversely of said side edge as a continuation of the lower portion of the outer side wall to define the base of said respective outermost trough-shaped portion and an upwardly and inwardly inclined inner side wall extending as a continuation of said respective bottom wall and to a position at least above a plane containing said side edges;*

*a plurality of top walls extending transversely of said side edges connecting said trough-shaped portions;*

*each of said upwardly and outwardly inclined outer side walls having venting and spacing means projecting away therefrom;*

*said venting and spacing means being located at spaced intervals along the extent of said outer side wall;*

*the inner side wall of each of said outermost trough-shaped portions being substantially smooth and free of said venting and spacing means for substantially the length of the respective outermost trough-shaped portions;*

*whereby said spacing means on said outer side wall on the first of said nested trough-shaped portions abuts said inner side wall of said remaining nested trough-shaped portion and said spacing means on said outer side wall of said remaining trough-shaped portion abuts the inner side wall of said first trough-shaped portion thereby defining a transverse moisture-venting passageway between the nested and lapped outermost trough-shaped portions of adjacent sheets.*

*11. A form in accordance with claim 10 wherein said spacing means are dimples.*

*12. A form in accordance with claim 10 wherein said spacing means project from all of the walls of said lapped and nested trough-shaped portions.*

*13. A form in accordance with claim 12 wherein said spacing means are ribs.*

References Cited by the Examiner

The following references, cited by the Examiner, are of record in the patented file of this patent or the original patent.

UNITED STATES PATENTS

| | | | |
|---|---|---|---|
| 407,966 | 7/1889 | Sagendorph | 52—537 X |
| 840,016 | 1/1907 | Schlafly | 52—450 |
| 934,939 | 9/1909 | Schlafly | 52—534 |
| 1,220,463 | 3/1917 | Schnug | 52—534 |
| 1,710,890 | 4/1929 | Ochiltree | 52—521 |
| 2,004,052 | 6/1935 | Little | 52—534 |
| 2,724,872 | 11/1955 | Herbes | 52—553 |

FOREIGN PATENTS

| | | |
|---|---|---|
| 884,420 | 7/1953 | Germany. |
| 731,453 | 6/1955 | Great Britain. |

FRANK L. ABBOTT, *Primary Examiner.*

M. O. WARNECKE, *Assistant Examiner.*